United States Patent
Bjarnestam et al.

(10) Patent No.: US 7,523,102 B2
(45) Date of Patent: Apr. 21, 2009

(54) CONTENT SEARCH IN COMPLEX LANGUAGE, SUCH AS JAPANESE

(75) Inventors: Anna Bjarnestam, Angelsberg (SE); Monika MacGuffie, Seattle, WA (US); David Carothers, Seattle, WA (US)

(73) Assignee: Getty Images, Inc., Seattle, WA (US)

( * ) Notice: Subject to any disclaimer, the term of this patent is extended or adjusted under 35 U.S.C. 154(b) by 363 days.

(21) Appl. No.: 11/149,453

(22) Filed: Jun. 8, 2005

(65) Prior Publication Data

US 2006/0031207 A1     Feb. 9, 2006

Related U.S. Application Data

(60) Provisional application No. 60/610,741, filed on Sep. 17, 2004, provisional application No. 60/582,759, filed on Jun. 25, 2004, provisional application No. 60/579,130, filed on Jun. 12, 2004.

(51) Int. Cl.
*G06F 7/00* (2006.01)
*G06F 17/30* (2006.01)

(52) U.S. Cl. ................. 707/3; 707/6; 707/7; 704/7; 715/256

(58) Field of Classification Search ........... 707/1–10, 707/100–104.1, 200–206; 704/2, 4, 7, 9, 704/8; 715/531, 535, 536, 540, 256, 264, 715/249, 254, 260; 717/100, 101, 104, 108, 717/120

See application file for complete search history.

(56) References Cited

U.S. PATENT DOCUMENTS 5,109,509 A     4/1992   Katayama et al.
5,337,233 A     8/1994   Hofert et al.
5,469,354 A *   11/1995  Hatakeyama et al. .......... 707/3

(Continued)

FOREIGN PATENT DOCUMENTS

JP     2001/202388     7/2001

(Continued)

OTHER PUBLICATIONS

Hollaar, L.A., Implementation and evaluation of a parallel text searcher for very large text databases, Jan. 7-10, 1992, IEEE.*

(Continued)

*Primary Examiner*—Jean B Fleurantin
(74) *Attorney, Agent, or Firm*—Perkins Coie LLP

(57) ABSTRACT

A search facility provides searching capabilities in languages such as Japanese. The facility may use a vocabulary knowledge base organized by concepts. For example, each concept may be associated with at least one keyword (as well as any synonyms or variant forms) by applying one or more rules that relate to identifying common main forms, script variants, alternative grammatical forms, phonetic variants, proper noun variants, numerical variants, scientific name, cultural relevance, etc. The contents of the vocabulary knowledge base are then used in executing search queries. A user may enter a search query in which keywords (or synonyms associated with those key words) may be identified, along with various stopwords that facilitate segmentation of the search query and other actions. Execution of the search query may result in a list of assets or similar indications being returned, which relate to concepts identified within the search query.

19 Claims, 12 Drawing Sheets

U.S. PATENT DOCUMENTS

| | | |
|---|---|---|
| 5,619,410 A | 4/1997 | Emori et al. |
| 5,778,361 A | 7/1998 | Nanjo et al. |
| 5,963,893 A | 10/1999 | Halstead, Jr. et al. |
| 6,035,269 A | 3/2000 | Kim |
| 6,094,647 A * | 7/2000 | Kato et al. .................. 707/2 |
| 6,341,176 B1 | 1/2002 | Shirasaki et al. |
| 6,356,866 B1 | 3/2002 | Pratley et al. |
| 6,411,948 B1 | 6/2002 | Hetherington et al. |
| 6,470,334 B1 | 10/2002 | Umemoto et al. |
| 6,496,844 B1 | 12/2002 | Hetherington et al. |
| 6,602,300 B2 | 8/2003 | Ushioda et al. |
| 6,731,802 B1 * | 5/2004 | Kacmarcik et al. .......... 382/185 |
| 6,735,583 B1 | 5/2004 | Bjarnestam et al. |
| 2002/0022953 A1 | 2/2002 | Bertolus et al. |
| 2003/0028564 A1 | 2/2003 | Sanfilippo |
| 2003/0063113 A1 | 4/2003 | Andrae |
| 2004/0030543 A1 | 2/2004 | Kida et al. |

FOREIGN PATENT DOCUMENTS

| | | |
|---|---|---|
| JP | 2001/344282 | 12/2001 |

OTHER PUBLICATIONS

Hess, M., Deduction over mixed-level logic representations for text passage retrieval, Nov. 6-19, 1996, IEEE, 383-390.*

Teller, V. et al.: "The Probabilistic Algorithm for Segmenting Non-Kanji Japanese Strings," Proceedings National Conference on Artificial Intelligence, vol. 1, Jul. 31, 1994, pp. 742-747.

Rowley, H. A. et al.: "The Effect of Large Training Set Sizes on Online Japanese Kanji and English Cursive Recognizers," Frontiers in Handwriting Recognition, 2002. Proceedings, Eight International Workshop, Aug. 6-8, Piscataway, NJ, USA, IEEE Aug. 6, 2002, pp. 38-40.

* cited by examiner

CONTENT SEARCH IN COMPLEX LANGUAGE, SUCH AS JAPANESE

CROSS-REFERENCE TO RELATED APPLICATIONS

This application claims priority to the following commonly owned provisional applications: U.S. Provisional Application No. 60/579,130, filed Jun. 12, 2004, entitled "Content Search in Complex Language, Such as Japanese," U.S. Provisional Application No. 60/582,759, filed Jun. 25, 2004, entitled "Cross Orthographic Search and Disambiguation in Japanese—a Solution," and U.S. Provisional Application No. 60/610,741, filed Sep. 17, 2004, entitled "Localizing Concepts for Search Retrieval." The above-referenced applications are herein incorporated by reference.

BACKGROUND

Computer-implemented searching may be performed in many languages, and is a useful tool that has many applications. Some languages, such as English, are more conducive to searching because of the way that they are structured and organized. Other languages, such as Japanese have not been conducive for structured, organized computer-implemented searching.

Written Japanese is complex and inherently ambiguous for many reasons. Writing or typing Japanese typically involves the use of a combination of three orthographic scripts—kanji, katakana, and hiragana. For example, a single word may contain a combination of two scripts, while a single phrase may contain a combination of all three scripts. Writers of Japanese may also use the Latin alphabet in a form called romaji or romanization, allowing for even more variations. In addition, both Japanese and Arabic numerals may be used to represent numbers, resulting in even more variations. Thus, complexities arise because a given semantic concept can be written using multiple orthographic (written) forms. Likewise, a given orthographic form can have multiple meanings, depending on the pronunciation (or contextual reading) of the written form. In other words, such orthographic forms are inherently ambiguous, and can only be disambiguated based on how the written form is pronounced or read.

As a result of these complexities and ambiguities inherent in the Japanese language, developers have struggled to implement text-based search tools for the Japanese language (e.g., in the context of computerized information). While some existing search tools, including the Goo search engine (www.goo.ne.jp), have Japanese language searching capabilities, at best, these tools are based on simple text pattern matching and are not based on any intelligence by the system about either the semantics of a given expression or its orthography (i.e., the fact that a given written expression can be written in numerous ways).

Figure 1:
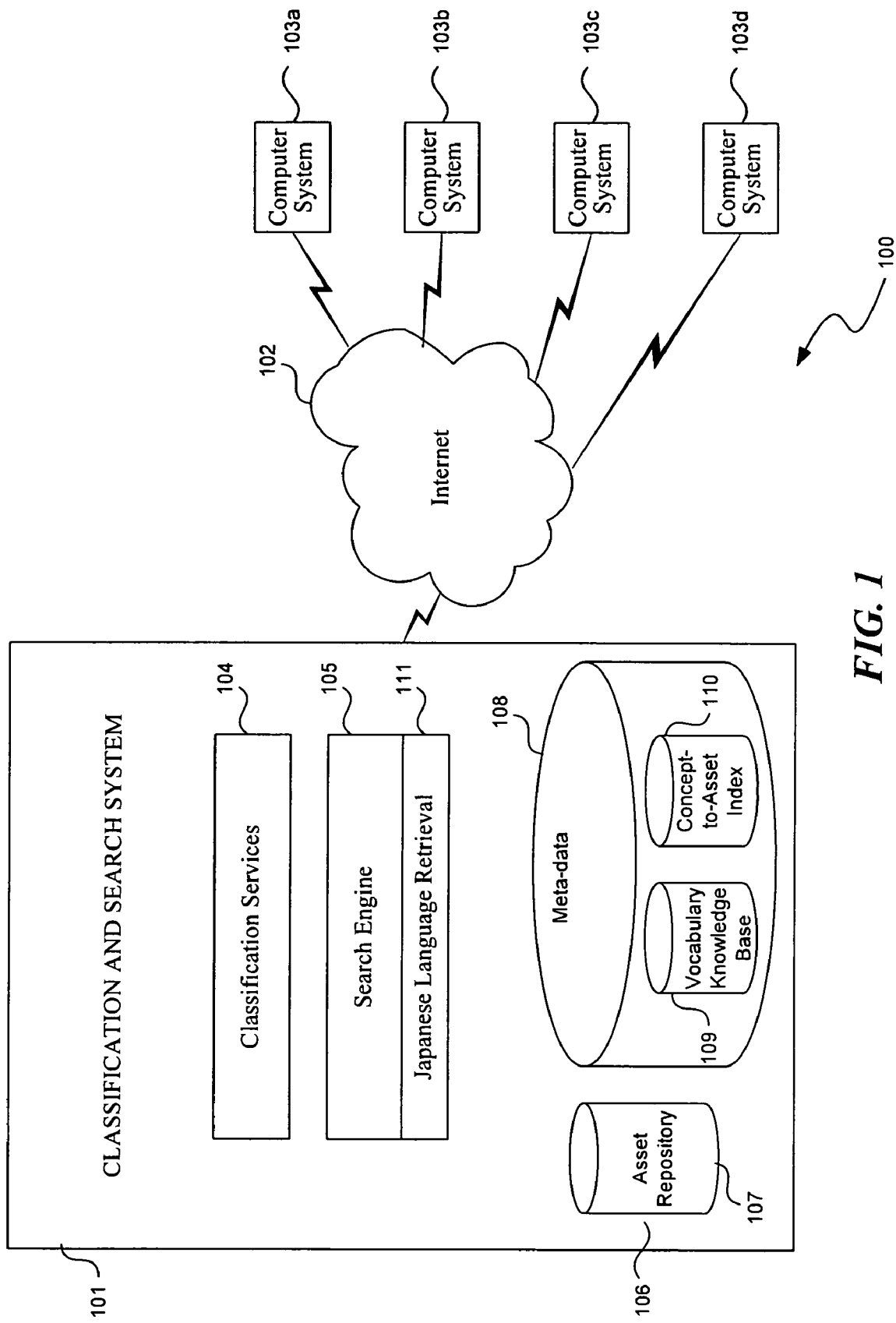
FIG. 1 is a block diagram showing a representative environment in which a complex language search facility may be implemented in some embodiments.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

A method and system for orthographic disambiguation and cross-orthographic searching in complex languages, such as the Japanese language, is provided, and may be referred to herein as "the complex language search facility" or "the facility." The facility may include orthographic disambiguation of each search query. In some embodiments, the facility disambiguates text-based Japanese search queries written in kanji, hiragana, and/or katakana, and to some extent romaji, and most combinations thereof. The facility may support orthographic disambiguation that works with common search operators such as the Boolean operators AND, OR, and NOT, which may also be identified as stopwords during segmentation. The facility may also support disambiguation of any combination of words or phrases that is written without any operators at all. Likewise, disambiguation works on search queries that do not contain any word boundaries, such as white spaces.

In some embodiments, the complex language search facility functions so that a result set returned for a given semantic concept written orthographically in any accepted form retrieves the same search result. While a portion of this description provides a detailed example of an implementation of the method and system for searching in the Japanese language, one skilled in the art will understand that implementations in other complex orthographic languages (e.g., Chinese, Korean, German, etc.) may be possible without departing from the scope of the invention.

As described in detail below, the complex language search facility may have applications in the context of searching for assets or other types of content that can be stored and represented, at least to some extent electronically. For example, the facility may be applied in almost any type of search environment, whether the environment is online or offline. Examples of such environments include searching for images in an image database, searching for products in an e-commerce retail setting, searching for documents in a document library, searching for words or items within a document, searching in the context of a free-text search engine, searching for terms to replace with synonyms in a word processing document, searching in the context of document archiving, and so on. The facility may also be portable, and is not limited for use within any specific computer application.

II. System Architecture and Implementation

FIG. 1 and the following discussion provide a brief, general description of a suitable environment in which the complex language search facility can be implemented. Although not required, aspects of the facility are described in the general context of computer-executable instructions, such as routines executed by a general-purpose computer (e.g., a server computer, wireless device, or personal/laptop computer). In addition, human intervention may occur with respect to one or more of these routines. Those skilled in the relevant art will appreciate that the invention can be practiced with other communication, data processing, or computer system configurations, including Internet appliances, hand-held devices (including personal digital assistants (PDAs)), wearable computers, all manner of cellular or mobile phones, embedded computers (including those coupled to vehicles), multi-processor systems, microprocessor-based or programmable consumer electronics, set-top boxes, network PCs, mini-computers, mainframe computers, and the like. Indeed, the terms "computer," "host," and "host computer" are generally used interchangeably and refer to any of the above devices and systems, as well as any data processor.

Aspects of the facility can be embodied in a special purpose computer or data processor that is specifically programmed, configured, or constructed to perform one or more of the computer-executable instructions explained in detail herein. Aspects of the facility can also be practiced in distributed computing environments where tasks or modules are performed by remote processing devices, which are linked through a communication network. In a distributed computing environment, program modules may be located in both local and remote memory storage devices.

Aspects of the facility may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the facility reside on a server computer, while corresponding portions reside on a client computer, such as a mobile device.

FIG. 1 is a block diagram that provides an example of an environment 100 in which the complex language search facility may be implemented. In this example, the environment 100 includes a classification and search system 101 (e.g., an image or media classification and search system) driven by a structured vocabulary. The classification and search system 101 is connected to a communication medium, for example, the Internet 102, which is in turn connected to one or more computer systems (103*a-d*). The classification and search system 101 includes a classification services component 104 that allows for the classification of assets (e.g., images, documents, item descriptions, or other units of content). The classification and search system 101 may also include a search engine 105 and one or more data repositories 106. For example, the data repositories 106 may include an asset repository 107 and a meta-data repository 108 that may comprise a vocabulary knowledge base 109 and a concept-to-asset index 110. While shown as a particular set of repositories in a particular configuration, it is possible for the one or more data repositories 106 to exist in other combinations.

The search engine 105 may provide routines that, in response to a user search query, locate and retrieve one or more assets from the asset repository 107 using information associated with the vocabulary knowledge base 109 and the concept-to-asset index 110. The search engine 105 is configured to include a complex language retrieval system 111, which allows the search engine 109 to retrieve assets from the asset repository 107, even when search queries contain search terms from complex languages (e.g. Japanese).

The asset repository 107 stores information for individual assets and/or collections of assets, while the meta-data repository 108 stores information that links each asset to one or more concepts. For example, a photograph of a girl running on a beach may be linked to the concepts of "girl, "dog," and "beach." In some embodiments, the classification services component 104 provides routines to classify assets stored in the asset repository 107 by associating each asset (and/or collection of assets) with concepts from the vocabulary knowledge base 109. These classification routines may rely on user interaction or may be fully automated. Once the assets have been classified in this way, the concept-to-asset index 110 is generated, which associates each concept from the vocabulary knowledge base 109 with one or more assets.

The vocabulary knowledge base 109 may comprise a knowledge base of keywords that can be mapped to search terms from a user search query. For some languages (e.g., Japanese), the vocabulary knowledge base 109 contains several groupings of keywords, so that keywords having possible common meanings are grouped and associated with a common concept. For example, the vocabulary knowledge base 109 may include a separate data structure for each recognized concept, with each concept data structure including information associated with one or more keywords. In addition, each concept (and its associated keywords) may be associated with a unique keyword ID.

In some embodiments, the concepts within the vocabulary knowledge base 109 may be structured hierarchically, such that concepts located farther down in the hierarchy provide more specificity than concepts located higher up in the hierarchy. For example, as is described in more detail in U.S. Pat. No. 6,735,583, concepts (referred to as "vocabulary units" or "terms" in the above-referenced patent) within the vocabulary knowledge base 109 may be arranged in a tree or n-plex structure with subordinated concepts being logical subsets of the concepts to which they are subordinated.

In the case of the Japanese language, the vocabulary knowledge base 109 may comprise a knowledge base of concepts and keywords that are localized into Japanese following linguistic rules of written Japanese to allow for orthographic disambiguation and searching using Japanese. As illustrated by way of example in FIGS. 2A-2E, in some embodiments, a set of linguistic rules for implementing the vocabulary knowledge base 109 for searching in the Japanese language is as follows:

Common Main Form: Application of this rule includes identifying a main orthographic form for each semantic concept based on the most commonly used spelling (which may be associated with a keyword identification number in the vocabulary knowledge base 109). In the case of Japanese, this main form is probably kanji or possibly katakana. This form becomes the keyword, as shown in block 204 of FIG. 2A. In less frequent cases where the hiragana form is more popular than the kanji, the hiragana form may be used as the keyword instead of the kanji or katakana form. For example, in FIG. 2A, the concept represented by the English word "freedom" 200 is written most commonly using the kanji orthographic form, shown in block 206.

Common Script Variants—Hiragana: In this case of Japanese, application of this rule includes identifying, for each semantic concept, forms for all hiragana variants (that have not already been identified as a keyword). These variants are added to the vocabulary knowledge base 109 as synonyms. For example, the concept represented by the English word "freedom" 200 can be written using the hiragana variant shown in block 208. The variant of block 208 is, thus, added to the vocabulary knowledge base 109 as a recognized variant for the concept of "freedom" and linked to the same keyword identification number 204 as the main form (e.g., a kanji variant 206). Thus, when creating a search query, if a system user types the hiragana variant of block 208 or the kanji variant of block 206, the facility recognizes either of these search queries as being linked to the same concept 200, and retrieves the same search results (e.g., documents, images, etc.) in either case.

Common Script Variants—Katakana: Application of this rule includes, for each written kanji form, adding forms for all katakana variants (that have not already been identified as a keyword) to the vocabulary knowledge base 109 as synonyms. For example, the concept represented by the English word "freedom" 200 can be written using the katakana variant shown in block 210 of FIG. 2A. Accordingly, this variant, like the hiragana variant 208, is added to the vocabulary knowledge base 109 as a recognized variant for the concept of "freedom" and linked to the same keyword identification number 204 as the kanji variant 206. Thus, when creating a search query, if a user types the hiragana variant of block 208, the katakana variant of block 210, or the kanji variant of block 206, the facility retrieves the same search results in every case.

Figure 2A:
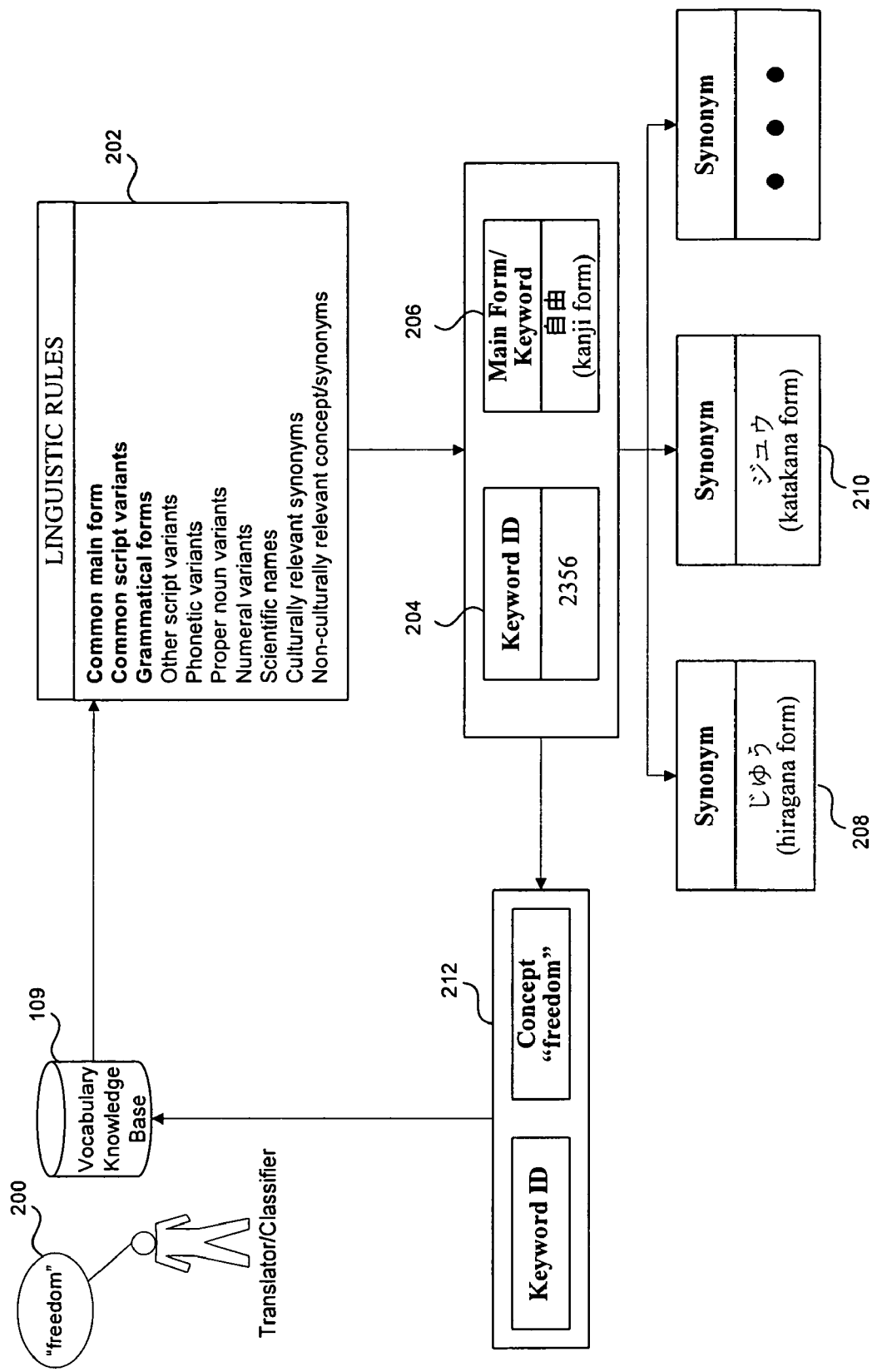
FIGS. 2A-2E are data diagrams showing examples of applying rules to create the vocabulary knowledge base of FIG. 1.
Figure 2B:
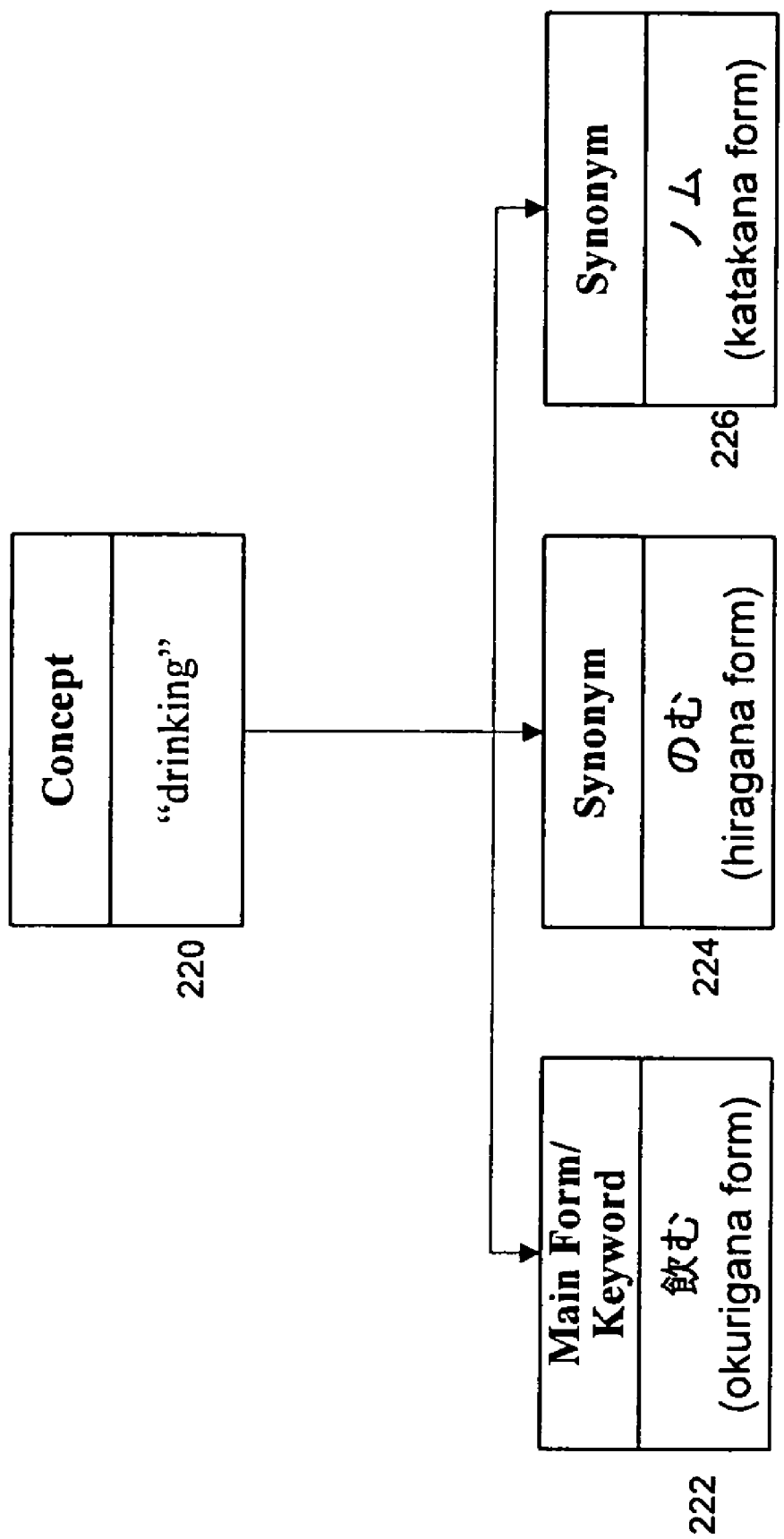

Table 202 in FIG. 2A represents various rules that can be applied to create/update the vocabulary knowledge base 109, with the three rules being applied above highlighted in bold text. Once the rules of table 202 have been applied, a relationship 212 between the concept of freedom and the keyword ID may be implemented in the vocabulary knowledge base (e.g., the keyword ID may function as a primary key in a database to represent the concept as it relates to its main form and all synonyms). Accordingly, the relationship 212 may be used as a tool during searching to retrieve assets associated with keywords, which are linked to synonyms, and which in turn are linked to assets. Some of the rules in table 202 that are not shown in bold text may not be particularly relevant when using the example of "freedom" as a semantic concept. However, such rules may be applicable with respect to other semantic concepts, as described with respect to the following additional rules and examples, which are illustrated in further detail with respect to FIGS. 2B-2E.

Grammatical Forms: Application of this rule may include, for each semantic concept, adding forms for all okurigana variants (kanji+hiragana grammatical ending) to the vocabulary knowledge base 109 as synonyms. (In the Japanese language, okurigana variants, which are common among verbs in particular, are hiragana endings used to modify verb tense.) For example, the concept associated with the English word "drinking" (block 220 of FIG. 2B) is most commonly written using the okurigana variant, which is shown in block 222. This form is, thus, set as the main form/keyword. In the illustrated example, the first character of the okurigana variant 222 is kanji and the last character is hiragana. For the "drinking" example 220, the all-hiragana variant is shown in block 224 and the all-katakana variant is shown in block 226. Both of these forms are set as synonyms.

Figure 2C:
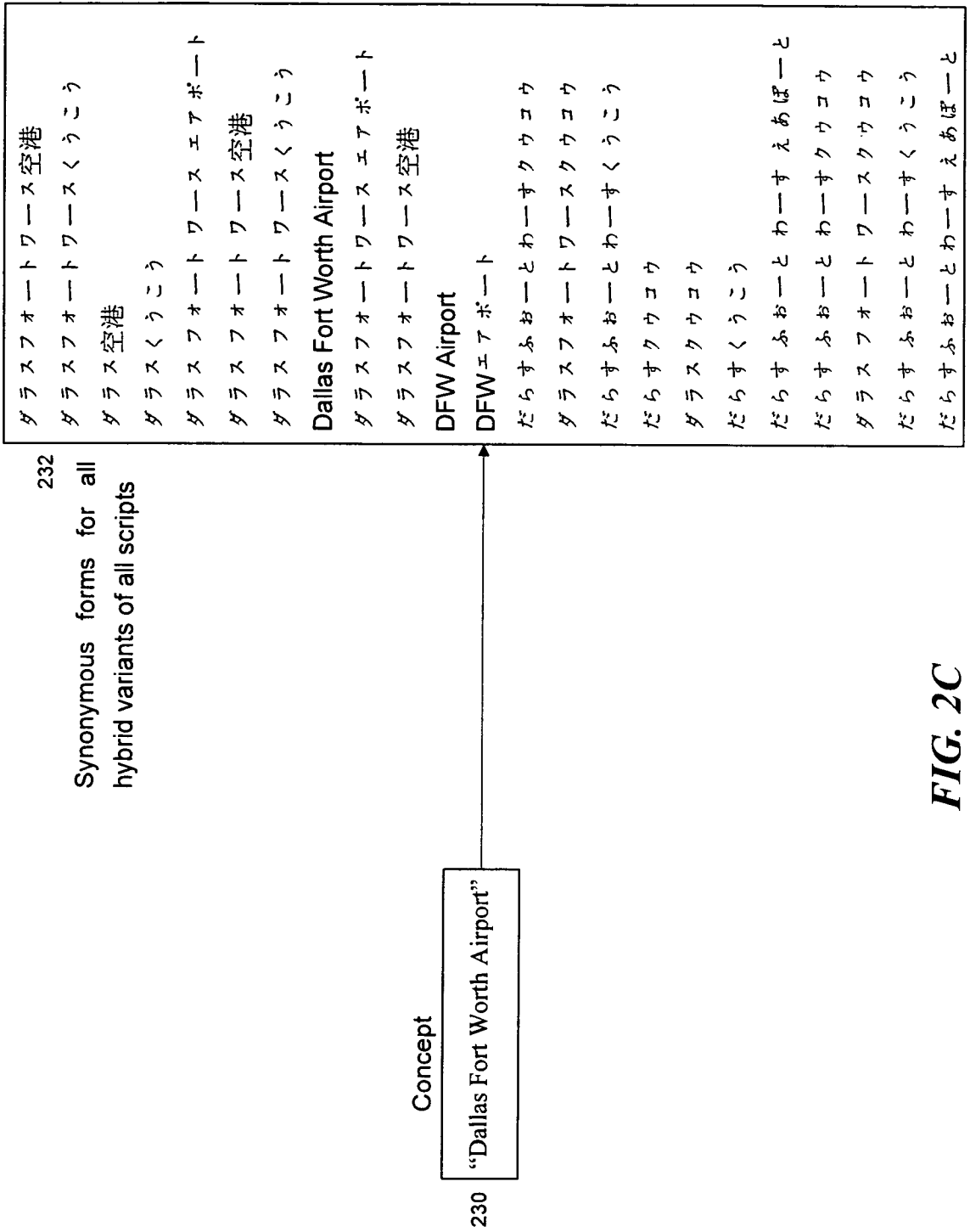

Other Script Variants: Application of this rule may include, for each semantic concept, adding forms for all hybrid variants of all scripts (including romaji) to the vocabulary knowledge base 109 as synonyms. For example, as shown in FIG. 2C, some concepts, such as "Dallas Fort Worth Airport" (block 230), are rendered using any combination of the aforementioned orthographic scripts, shown as recognized variant forms in block 232.

Figure 2D:
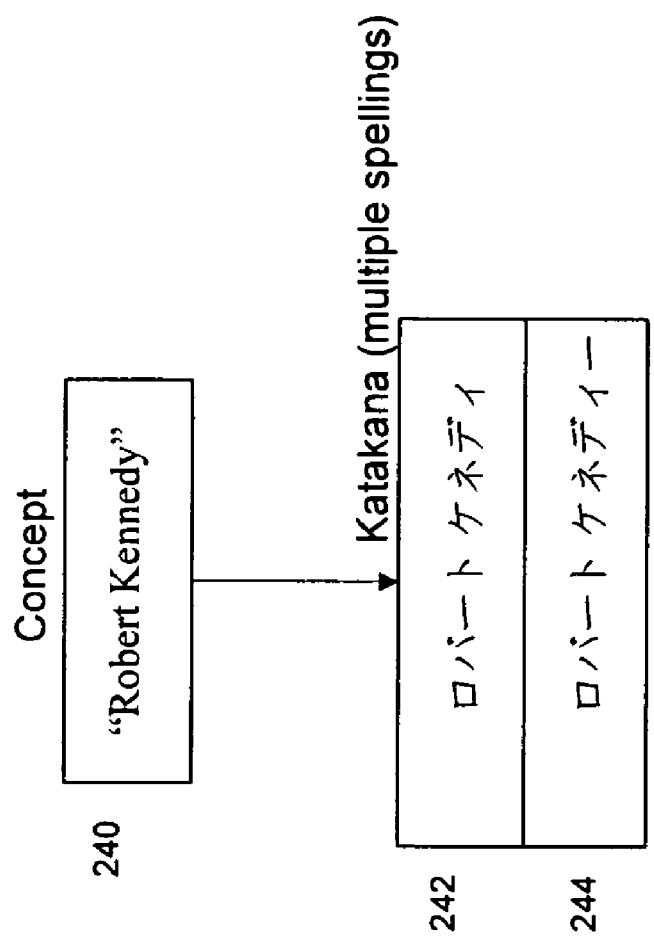
Figure 2E:
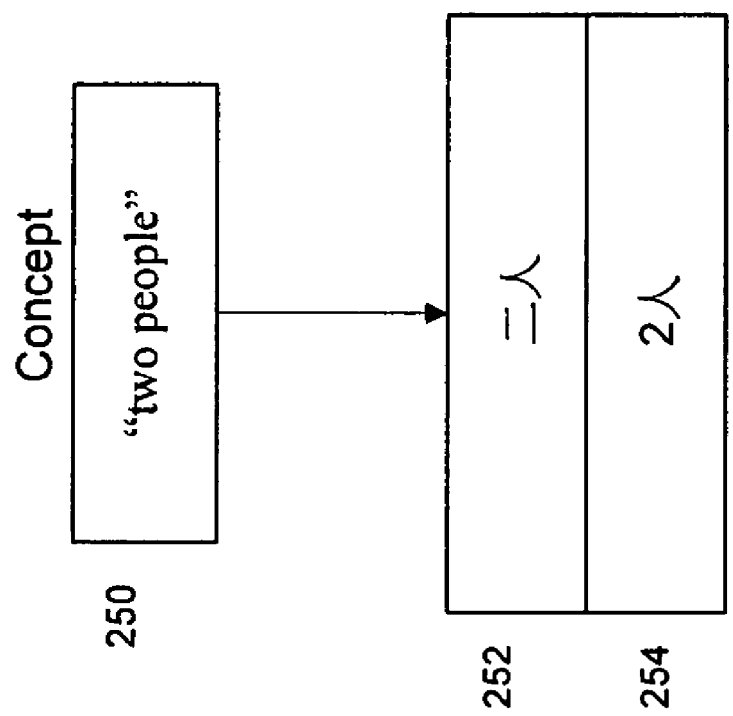

Phonetic Variants: Application of this rule may include, for each semantic concept, adding forms for all phonetic substitutes (where the same concept has multiple alternative phonetic spellings) to the vocabulary knowledge base 109 as keywords. For example, as shown in FIG. 2D, the semantic concept for "Robert Kennedy" (block 240) can be written using multiple alternative katakana phonetic spellings (all are correct), shown in blocks 242 and 244.

Proper Noun Variants: Application of this rule may include, for each semantic concept of proper nouns, which are people or place names, adding the English and/or native spelling variants to the vocabulary knowledge base 109 as keywords. For example, "Robert Kennedy" might retrieve the same search results as Robert Kennedy written in katakana (block 242 or 244).

Numeral Variants: Application of this rule may include, for each semantic concept containing numerals, adding forms for all Arabic numerals and katakana variants to the vocabulary knowledge base 109 as keywords. More specifically, numbers can be written in various orthographic forms (kanji, hiragana, katakana), which may include Arabic numerals in the variants. For example, the concept of "two people" (block 250 of FIG. 2E) may be portrayed with either of the variants shown in blocks 252 and 254.

Scientific Names: Application of this rule may include, for each semantic concept of plants and animals, adding the scientific name (using Latin script) to the vocabulary knowledge base 109 as a synonym.

Culturally Relevant Synonyms: Application of this rule may include, for each semantic concept, adding only those synonyms that are culturally appropriate to the given Japanese concept to the vocabulary knowledge base 109. For example, for any given semantic concept, an appropriate synonym in one culture may not be an appropriate synonym in another culture. This ensures that only culturally relevant semantic concepts are displayed during searches. For example, the semantic concept of "freedom" exists in Japan as it does in the United States. However, the "idea" or imagery that represents that concept may be different. Images of the Statue of Liberty, for example, may be associated with the keyword "freedom" on a web site in the United States. Those same images, however, may not best represent the concept of "freedom" for other cultures.

Once implemented (e.g., using any combination of the above rules—as well as possibly other rules), the vocabulary knowledge base 109 of FIG. 1 allows the facility to match Japanese orthographic variants provided in user search queries to sets of assets. While the above rules are specific to facilitate searching in Japanese, similar rules may be applied to facilitate searching in other languages.

Additional details relating to a representative environment in which the complex language search facility can be implemented and used is described in detail in commonly assigned U.S. Pat. No. 6,735,583, "Method and System for Classifying and Locating Media Content." However, the method and system for searching is not limited to use in such a system, and may be applied in almost any system where content searching applies, including the Internet, product or item catalogs, information repositories, etc.

III. System Flows

FIGS. 3 through 8 are representative flow diagrams that show processes that occur within the system of FIG. 1. These flow diagrams do not show all functions or exchanges of data but, instead, provide an understanding of commands and data exchanged under the facility. Those skilled in the relevant art will recognize that some functions or exchanges of commands and data may be repeated, varied, omitted, or supplemented, and other aspects not shown may be readily implemented. For example, while not described in detail, a message containing data may be transmitted through a message queue, over HTTP, etc.

Figure 3:
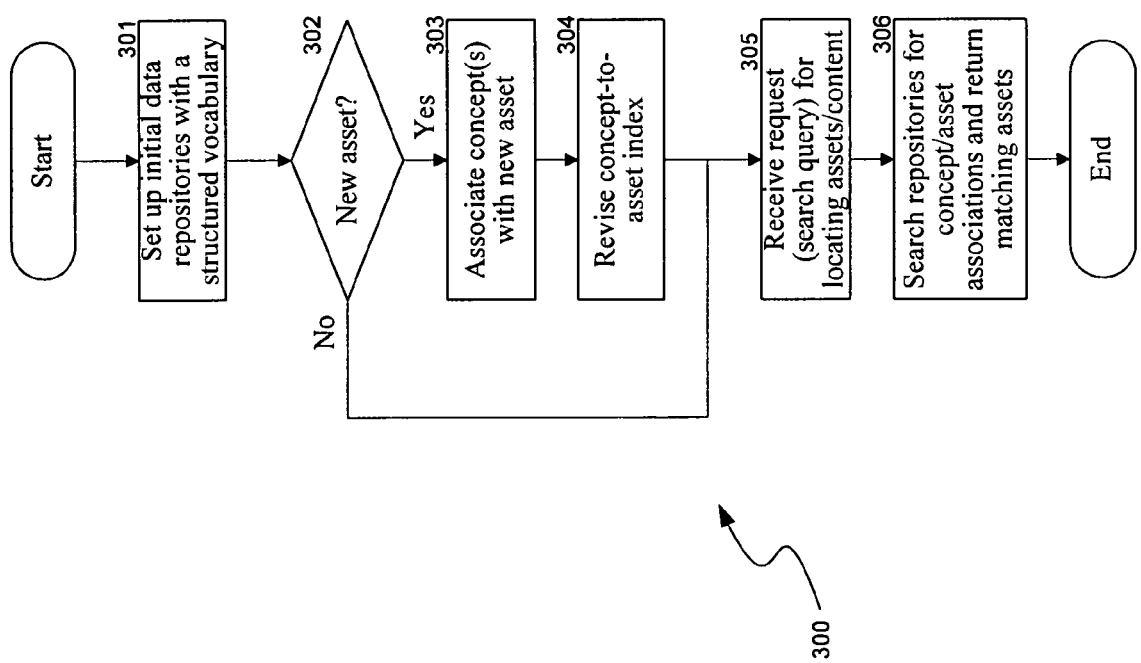
FIG. 3 is a flow diagram showing an overview of various processes performed by the facility in some embodiments.

The flow represented in FIG. 3 is a high-level flow showing a combined overview of various processes performed by the facility in some embodiments. Some of the individual processes or subtransactions are described in more detail in the Figures that follow. In the context of the components described with respect to FIG. 1, blocks 301 through 304 demonstrate how the vocabulary knowledge base 109, the meta-data repository 108, and the concept-to-asset index 110 are created and updated (e.g., when new assets are added).

At block 301, the facility creates or provides an initial structured vocabulary that classifies semantic concepts according to a hierarchy, provides an association of keywords for each semantic concept (e.g., using the rules described above), and stores this information in the vocabulary knowledge base 109. Likewise, relationships identified between individual assets and concepts are identified and indications of these relationships are stored in the concept-to-asset index 110. Similarly, other types of meta-data are associated with assets and stored in the meta-data repository 108.

At decision block 302, if there are new assets to be added to the facility, the routine 300 continues at block 303, else the routine continues at block 305. At block 303 the facility associates the new assets with specific concepts (which may involve user intervention). This may include updating the vocabulary knowledge base 109. As described above with respect to FIG. 1, the meta-data repository may use keyword identifiers instead of the concepts themselves to preserve language independence. This process is described in more detail in U.S. Pat. No. 6,735,583, which uses the words "term" and "term identifier" in place of the words "concept" and "keyword identifier," respectively.

At block 304, the facility assembles the concept-to-asset index 110, which allows the search engine 105 to locate assets through the keyword identifiers contained in the concept-to-asset index 110. Thus, the concept-to-asset index 110 serves as a "reverse" index of assets, arranged by associating each concept (or corresponding keyword identifier) with one or more assets.

In some embodiments, the facility may perform blocks 301-304 (or similar actions) independently of each other. The facility may execute these processes repeatedly and concurrently, as changes to the structured vocabulary, asset pool, etc., are desired. For example, as concepts derived from assets are added to the structured vocabulary, the facility may then use these concepts to "fine-tune" the complex language vocabulary for greater efficiency.

At block 305, the facility receives a request (e.g., a user provided search query) for desired assets. At block 306, the search engine 105 normalizes the received search query to convert its characters to standard form(s) used by the search engine 105, identifies concepts for the search query by searching for matches in the data repositories 107, 108, 109, and 110, and locates assets that are referred to by any keyword identifiers that correspond to the identified concepts. In a hierarchically structured vocabulary, the search engine 105 may also locate assets that are referred to by subordinate keyword identifiers according to their ranking in the vocabulary. The located assets are optionally displayed, for example, in a list or as electronic representations.

Several of the processes/routines described generally with respect to FIG. 3 are described below in more detail with respect to FIGS. 4-8, and may be applied, in particular, to complex languages, such as Japanese. For example, referring to FIG. 4, after a search query is entered (e.g., by a user 402), the facility performs normalization using a normalizer component 404. During normalization, the facility may convert the search query text to a standard form. For example, the facility may standardize any characters having multiple representations in an input character encoding that should be treated as identical. A user search query encoded in, for example, ISO 8859-1 (Latin 1) may automatically be normalized by the system and encoded as, for example, USC-002 (Unicode) so that the system thereafter will know how to interpret each representation. In some embodiments, the normalization may separate search tokens (e.g., predefined character groups including one or more characters) with spaces, convert half-width katakana queries to full-width katakana queries, etc. The normalization adheres to rules that specify which actions the system should implement, and these rules may be unique to a computer application.

The facility may then proceed to perform tokenization using a tokenizer 406. During tokenization, the facility may break up the search query so that vocabulary lookups can be performed on potential terms from the user search query. A parser component 408 then checks the tokens for matches in the Japanese vocabulary database. If no match is found for a token, the facility undergoes a segmentation subroutine performed by a segmentor component 410. The segmentation process is described in more detail with respect to FIGS. 5-8.

After segmentation, the search engine 105 may execute a search using any keywords found during parsing and segmentation by looking up results in the vocabulary knowledge base linking concepts to assets from the asset repository 107. For example, the facility may send the returned keyword identifiers to the asset repository 107 for retrieval of assets classified with the matching concepts. The search engine 105 may then return a result set to the user 402. The search engine 105 may also return a disambiguation request to the user, which is described in more detail in U.S. Pat. No. 6,735,583, referenced above.

Figure 4:
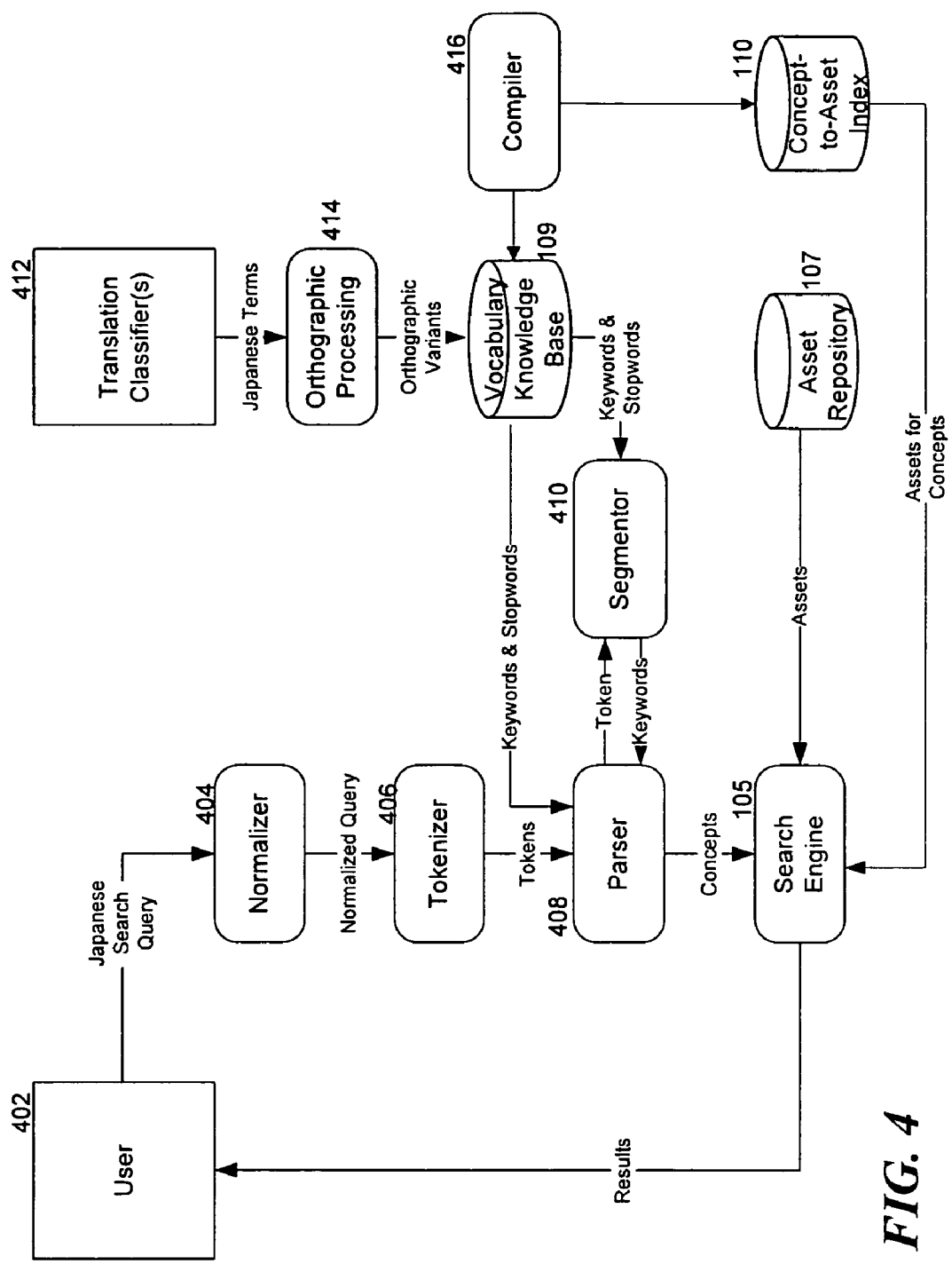
FIG. 4 is a flow diagram showing processes performed by various components of the facility, such as within the representative environment of FIG. 1.

FIG. 4 also illustrates examples of components that relate to the creation of the meta-data repository (not shown in this figure), including the vocabulary knowledge base 109 and the concept-to-asset index 110 of FIG. 1. For example, one or more translators or classifiers 412 may facilitate orthographic processing 414 of complex language keywords (e.g., keywords represented in Japanese) by applying the rules described with respect to FIGS. 2A-2E above to create the vocabulary knowledge base. Likewise, FIG. 4 illustrates the flow of data used in creating/updating components such as the concept-to-asset-index 110. A compiler component 416 may be involved in creating/updating both the vocabulary knowledge base and the concept-to-asset index.

Figure 5:
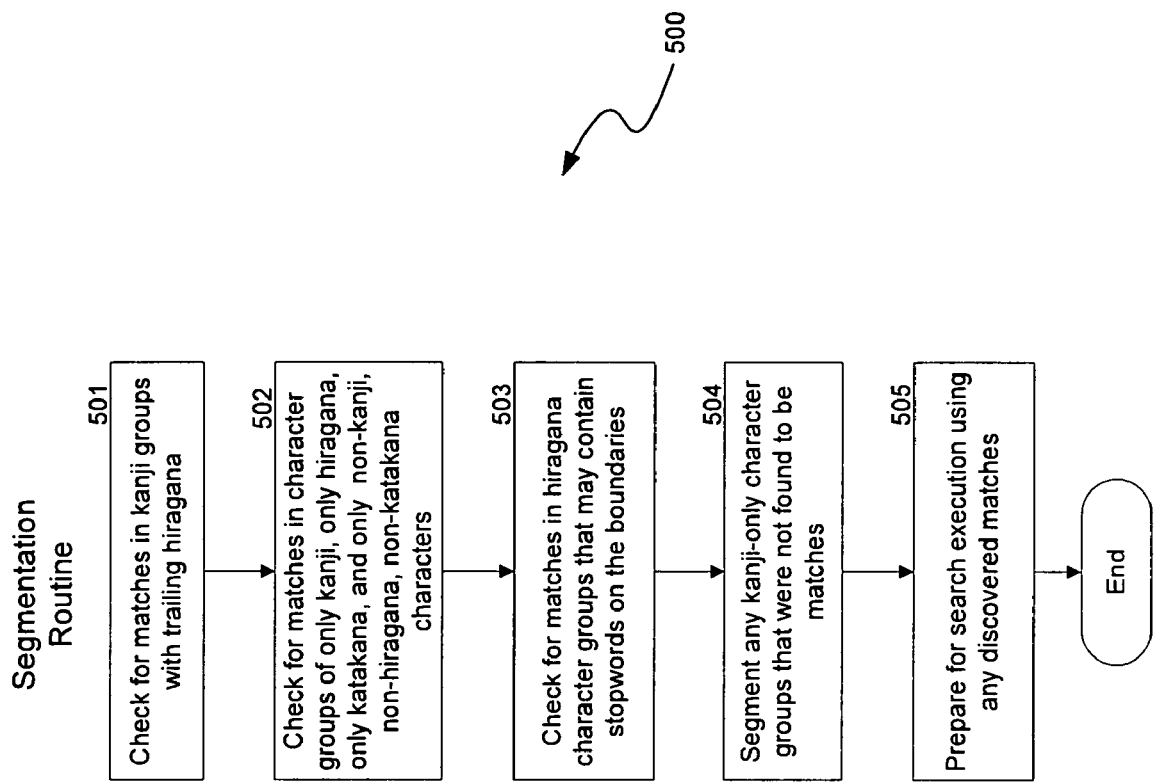
FIG. 5 is a flow diagram showing a segmentation routine of one embodiment.

Referring to FIG. 5, the facility may perform a segmentation routine 500 that allows certain user search queries to undergo further segmentation when the initial token matching is not successful. Segmentation may include the process of looking for keywords and stopwords within a single token by using both linguistic rules and contrived rules. For example, keywords and synonyms include any variants tied with concepts in the hierarchical knowledge base 109 of FIG. 1. Stopwords include a predetermined set of words that facility recognizes, but that are not keywords. For example, stopwords may include prepositions and other terms (e.g., and, the, or, etc.) When encountering stopwords, the facility may simply ignore and remove them from a search query. On the other hand, other terms such as Boolean values may invoke particular actions.

Any tokens that have not been identified as either keywords or stopwords during parsing may be candidates for segmentation. The segmentation routine is especially useful in the case of languages such as Japanese and German, where spaces are not always present between words and other autonomous language units. In general, the segmentation routine involves treating a given query string as a single token, examining that token to determine if it represents a single keyword, and if not, breaking the token up into smaller tokens by identifying keywords or stopwords within that token. The routine 500 of FIG. 5 provides an example of this process that is specific to the Japanese language. However, similar routines may be performed on other complex languages.

Blocks 501-505 describe the process for a single token. At block 501, the routine 500 checks for matches in kanji groups with trailing hiragana (e.g., by doing a lookup in the vocabulary knowledge base and/or using Unicode Character Code values to locate adjacent groups of related scripts (e.g., kanji, hiragana, katakana, other, etc.)). At block 502, the routine 500 checks for matches in character groups of only kanji, only hiragana, only katakana, and only non-kanji, non-hiragana, non-katakana characters. At block 503, the routine 500 checks for matches in hiragana character groups that may contain stopwords (such as the Japanese kanji for the concept "and" and other common or general terms such prepositions and articles that are not used as keywords during searching) on their boundaries.

At block 504, the routine 500 attempts to segment any kanji-only character groups that were not found to be matches. For example, the search string WXYZ may be segmented as: WXY, XYZ, WX, XY, YZ, W, X, Y, Z. If at block 504, a substring is found as a match, the routine 500 continues to check remaining substrings for matches until all substrings are checked. In some embodiments, the routine 500 then replaces the original token with the list of tokens (preserving character input order) found by segmentation including tokens containing characters not identified as keywords in blocks 501-504. At block 505, after all tokens have been segmented, the facility is then ready to execute a search using any keywords found during parsing and segmentation by looking up results in the vocabulary database linking keywords to assets.

Figure 6:
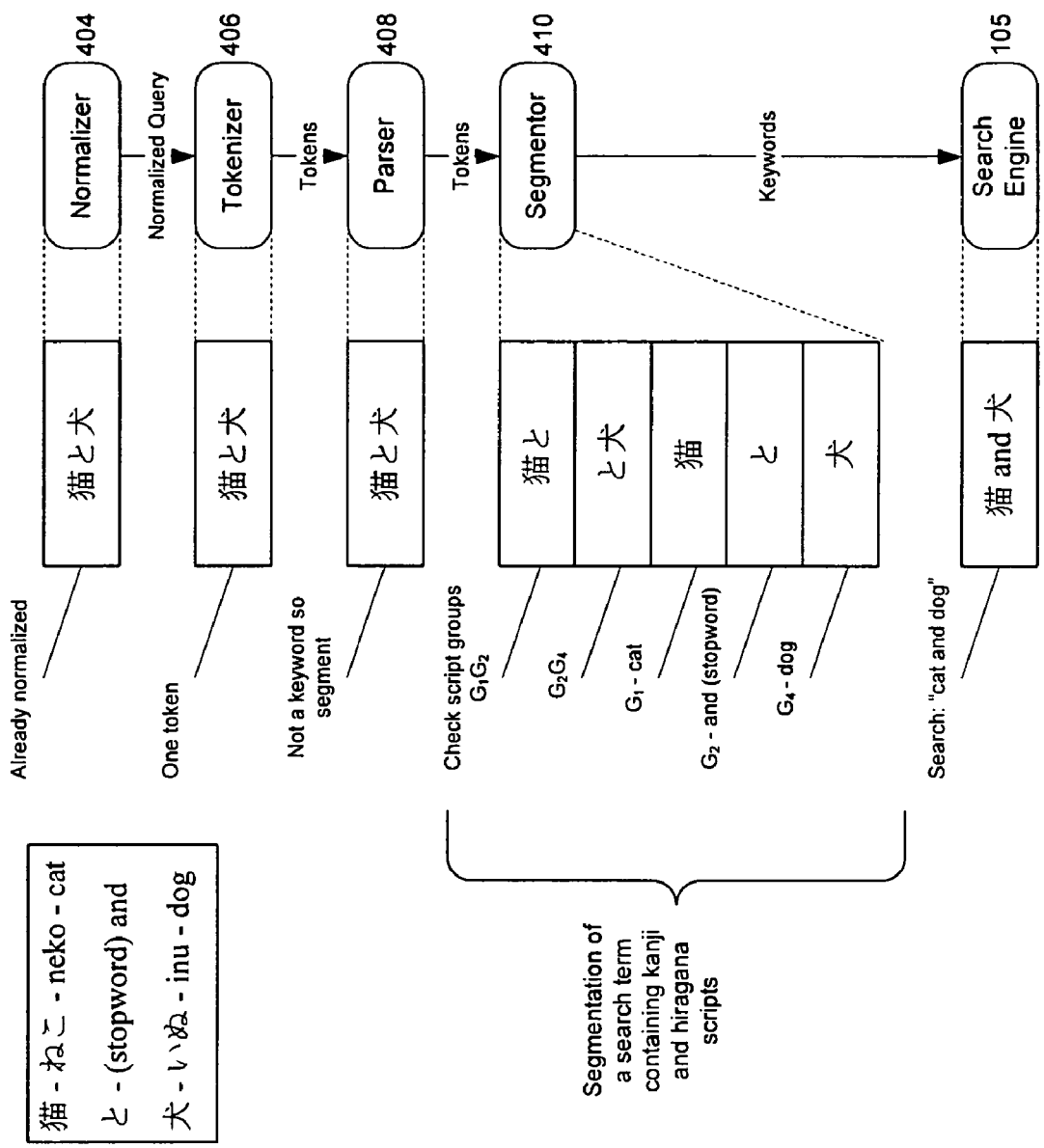
FIGS. 6-8 provide specific examples of processes associated with the segmentation routine of FIG. 5.
Figure 7:
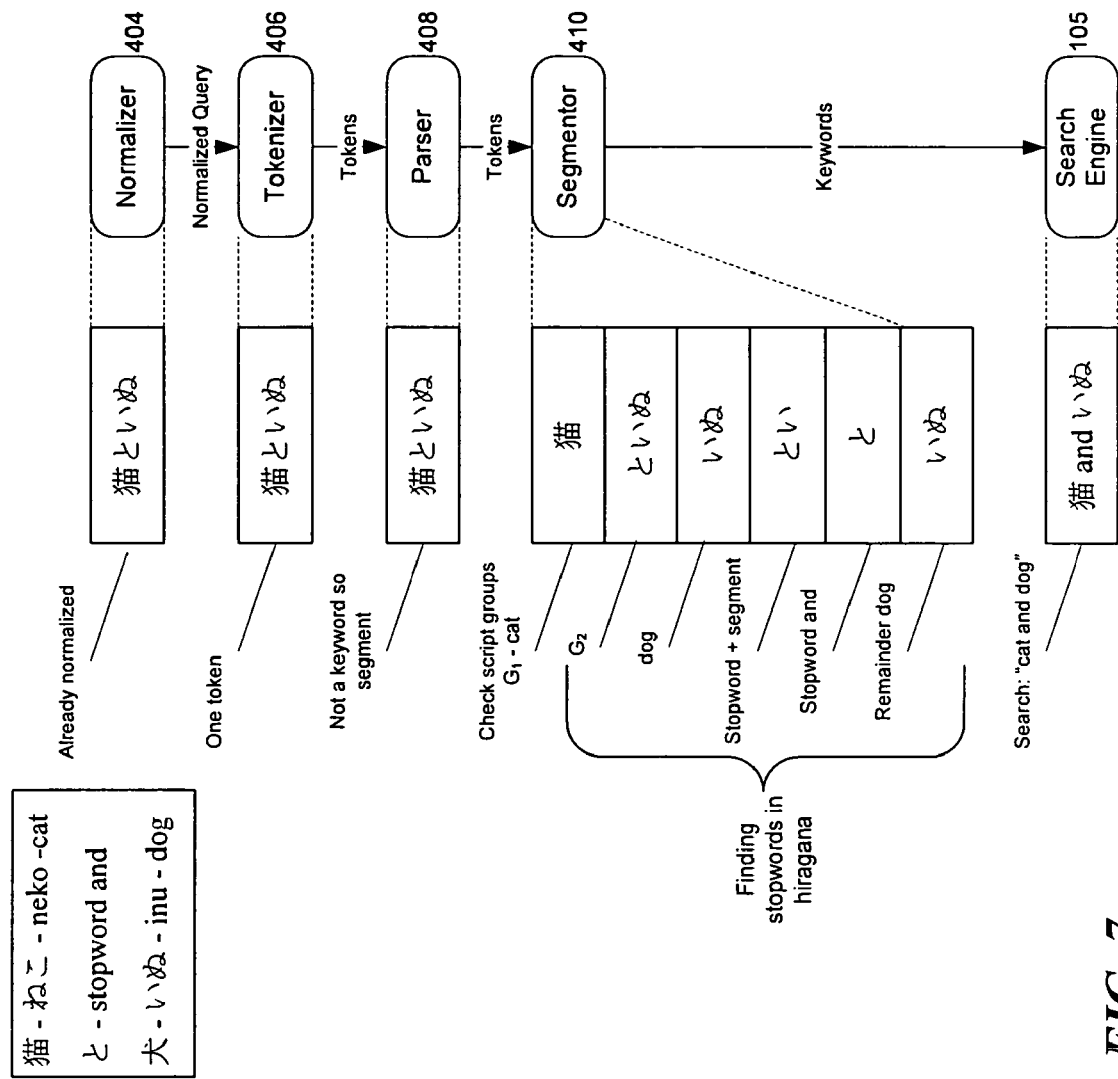
Figure 8:
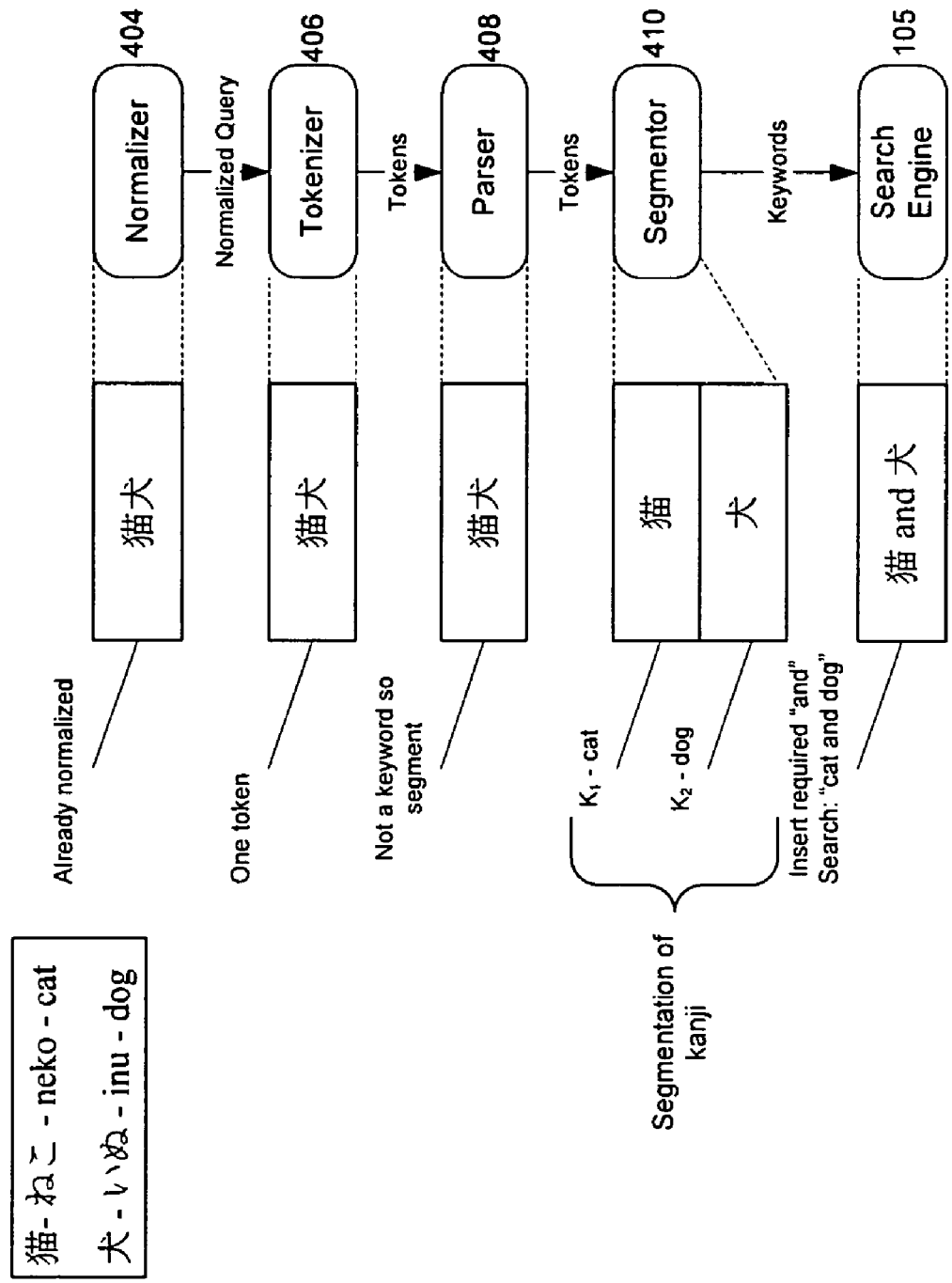

FIGS. 6-8, which are for the most part self-explanatory, provide specific examples of segmentation processes. More specifically, FIG. 6 provides an example of segmentation of a search query (e.g., containing the concept of "cat and dog") containing both kanji and hiragana scripts. In the example of FIG. 6, the facility checks combinations of adjacent script groups (by lookup in the Japanese vocabulary) to determine the existence of keywords or stopwords. For example, for script groups $G_1G_2G_3G_4$, the facility checks: $G_1G_2G_3$, $G_2G_3G_4$, $G_1G_2$, $G_2G_3$, $G_3G_4$, $G_1$, $G_2$, $G_3$, $G_4$.

FIG. 7 provides an example of finding stopwords (e.g., "and") in hiragana. In the example of FIG. 7, the facility checks for stopwords on the ends of hiragana character groups by performing a lookup in a stopword list. If a stopword is found, the facility checks the remaining portion of the character group as a keyword. More generally, for hiragana characters $H_1H_2H_3H_4$, the facility checks: $H_2H_3H_4$, $H_3H_4$, $H_4$, $H_1H_2H_3$, $H_1H_2$, $H_1$. Then, if a stopword is found, the facility determines if the remaining portion (e.g., for $H_1H_2H_3$, $H_4$ is the remaining portion) is a keyword.

FIG. 8 provides an example of segmentation of kanji. In the example of FIG. 8, the facility checks for keywords in kanji character groups. More generally, for kanji string $K_1K_2K_3K_4$, the facility checks: $K_1K_2K_3$, $K_2K_3K_4$, $K_1K_2$, $K_2K_3$, $K_3K_4$, $K_1$, $K_2$, $K_3$, $K_4$. If a substring is identified as a keyword, the facility continues to check remaining substrings.

IV. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways.

Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of the invention provided herein can be applied to other systems, not necessarily the system described herein. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the content sharing system and spam control and privacy management techniques may vary considerably in their implementation details, while still be encompassed by the invention disclosed herein. As noted above, particular terminology used when describing certain features or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A system for searching for content identified using text and symbols of a complex language associated with multiple written forms, the system comprising:
    a computer-readable storage medium having stored thereon an asset repository associated with multiple searchable assets;
    a computer-readable storage medium having stored thereon a vocabulary knowledge base for storing vocabulary information associated with the complex language, wherein the vocabulary knowledge base stores information related to multiple semantic concepts that are usable to identify assets within the asset repository, wherein the vocabulary knowledge base is generated or updated by a repeatable method comprising:
        assigning an identifier to a semantic concept;
        identifying a main written form for the semantic concept, wherein the main written form is based on at least one of the multiple written forms;
        for at least one of the multiple written forms associated with the complex language, associating at least one synonymous written form with the semantic concept, wherein the synonymous written form is at least partially distinct from the main written form; and
        storing the identifier, the main written form, and the at least one synonymous written form in a data storage component associated with the system; and
    a computing system having a processor to execute a search engine for receiving and executing queries for the searchable assets, wherein the execution is based, at least in part, on the contents of the vocabulary knowledge base.

2. The system of claim 1, further comprising, a classification component for classifying the searchable assets in the asset repository to facilitate matching between the searchable assets and the vocabulary information.

3. The system of claim 1 wherein the asset repository stores data associated with images.

4. The system of claim 1 wherein the asset repository stores data associated with documents.

5. The system of claim 1 wherein the vocabulary knowledge base is a subcomponent of a meta-data repository, and wherein the meta-data repository further comprises a concept-to-asset repository, for storing information associated with relationships between concepts from the vocabulary database and assets from the asset repository.

6. The system of claim 1 wherein the vocabulary knowledge base is structured hierarchically, such that concepts located farther down in the hierarchy provide more specificity than concepts located higher up in the hierarchy.

7. The system of claim 1 wherein the identified main written form is tagged as a keyword for searching.

8. The system of claim 1 wherein the language is Japanese, and wherein the multiple written forms include, kanji script, katakana script and hiragana script, okurigana variant, and romaji written form.

9. A computer-implemented method for executing a search query, the method comprising:
    receiving a search query including a textual expression, wherein the textual expression is written in a language that at least occasionally lacks discrete boundaries between words or autonomous language units;
    referencing a structured vocabulary knowledge base to determine whether the textual expression comprises a keyword or synonym associated with the structured vocabulary knowledge base, wherein the structured vocabulary knowledge base is for storing vocabulary information associated with a language having multiple orthographic forms or scripts, and wherien the structured vocabulary knowledge base is generated prior to receiving the search query by a repeatable method comprising:
        assigning an identifier to a semantic concept that is usable as a keyword or key phrase;
        identifying a main written form for the semantic concept, wherein the main written form is based on at least one of the multiple written forms;
        for at least one of the multiple written forms associated with the complex language, associating at least one synonymous written form with the semantic concept, wherein the synonymous written form is at least partially distinct from the main written form; and
        storing the identifier, the main written form, and the at least one synonymous written form in a data storage component associated with the vocabulary knowledge base;
    if the textual expression does not comprise a keyword, key phrase or synonym associated with the structured vocabulary knowledge base, performing segmentation on the textual expression, wherein the segmentation includes systematically splitting the textual expression into two or more segments, and identifying at least one keyword from the vocabulary knowledge based on the textual expression and the two or more segments;
    performing the search query using the at least one identified keyword; and
    providing for display results of the search query.

10. The method of claim 9 wherein the systematic splitting includes identifying predetermined stopwords that are not keywords, wherein at least some of the predetermined stopwords are prepositions.

11. The method of claim 9 wherein the systematic splitting includes splitting the textual expression into the longest segments possible in an effort to preserve the intended meaning of the textual expression.

12. The method of claim 9 wherein the systematic splitting includes an application of both linguistic rules and contrived rules.

13. The method of claim 9 wherein the systematic splitting includes identifying predetermined stopwords that are not keywords, wherein at least some of the predetermined stopwords represent Boolean values used in executing the search query.

14. The method of claim 9 wherein the language is Japanese, and wherein determining whether the textual expression in its entirety comprises a keyword or synonym associated with the structured vocabulary knowledge base includes checking for matches in kanji groups with trailing hiragana.

15. The method of claim 9 wherein the language is Japanese, and wherein determining whether the textual expression in its entirety comprises a keyword or synonym associated with the structured vocabulary knowledge base includes checking for matches in character groups of only kanji, only hiragana, only katakana, and only non-kanji non-hiragana non-katakana characters.

16. The method of claim 9 wherein the systematic splitting includes segmenting a textual expression WXYZ as: WXY, XYZ, WX, XY, YZ, W, X, Y, Z, wherein W, X, Y, and Z each represent a character or autonomous grouping of characters associated with the language.

17. The method of claim 9 wherein the search query is received via a network connection.

18. A method in a first computer system for retrieving a media content unit from a second computer system having a plurality of media content units that have been classified according to keyword terms of a structured vocabulary, comprising:

sending a request for a media content unit, the request specifying a search term;

receiving an indication of at least one media content unit that corresponds to the specified search term, wherein the search term is located within the structured vocabulary and is used to determine at least one media content unit that corresponds to the search term, and wherein orthographic variations of the search term are automatically provided to assist in determining the at least one media content unit that corresponds to the search term, wherein the structured vocabulary is generated at the second computer system prior to the first computer sending the request by a repeatable method comprising:

assigning an identifier to a semantic concept that is usable as a keyword or key phrase;

identifying a main written form for the semantic concept, wherein the main written form is based on at least one of the multiple written forms;

for at least one of the multiple written forms associated with the complex language, associating at least one synonymous written form with the semantic concept, wherein the synonymous written form is at least partially distinct from the main written form; and storing the identifier, the main written form, and the at least one synonymous written form in a data storage component associated with the vocabulary knowledge base; and displaying the at least one media content unit on a display.

19. The method of claim 18 wherein the keyword terms of the structured vocabulary are ordered such that the relationship of each term to each other term is inherent in the ordering.

* * * * *

UNITED STATES PATENT AND TRADEMARK OFFICE
CERTIFICATE OF CORRECTION

| | | |
|---|---|---|
| PATENT NO. | : 7,523,102 B2 | Page 1 of 1 |
| APPLICATION NO. | : 11/149453 | |
| DATED | : April 21, 2009 | |
| INVENTOR(S) | : Bjarnestam et al. | |

It is certified that error appears in the above-identified patent and that said Letters Patent is hereby corrected as shown below:

On Title page, in Item 56, in column 2, in "Other Publications", line 2, delete "IEEE." and insert -- IEEE, vol. i, 300-307. --, therefor.

On Title page 2, in column 2, under "Other Publications", in line 2, delete "6-19," and insert -- 16-19, --, therefor.

In column 12, line 35, in claim 9, delete "wherien" and insert -- wherein --, therefor.

Signed and Sealed this
Fifth Day of June, 2012

David J. Kappos
*Director of the United States Patent and Trademark Office*